United States Patent [19]
Turner

[11] 3,906,797
[45] Sept. 23, 1975

[54] ELECTRONIC TIME AND TEMPERATURE MEASURING SYSTEM

[75] Inventor: Robert Bruce Turner, Weymouth, Mass.

[73] Assignee: American Medical Electronics Corporation, Weymouth, Mass.

[22] Filed: May 28, 1974

[21] Appl. No.: 473,492

[52] U.S. Cl. .................... 73/362 AR; 73/362 AR
[51] Int. Cl.² ............................................ G01K 7/24
[58] Field of Search ................. 73/343, 362 AR, 344

[56] References Cited
UNITED STATES PATENTS
| | | | |
|---|---|---|---|
| 3,702,076 | 11/1972 | Georgi | 73/362 AR |
| 3,785,207 | 1/1974 | Brzezinski | 73/362 AR |

Primary Examiner—Richard E. Aegerter
Assistant Examiner—Willis Little
Attorney, Agent, or Firm—Joseph S. Iandiorio

[57] ABSTRACT

An electronic thermometer system comprising a temperature sensing circuit for providing an analog signal representative of variations in temperature; a temperature measuring circuit for providing a digital signal representative of the temperature sensed; a timing and control circuit for defining an operational interval including a temperature mode period and a time mode period, for generating pulses to measure a predetermined length of time during the time mode period, and for selectively presenting at its output the pulses measuring the predetermined length of time during the time mode period and a digital signal representative of the temperature sensed in the temperature mode period and a display circuit responsive to that output for selectively displaying the measured temperature and time.

6 Claims, 8 Drawing Figures

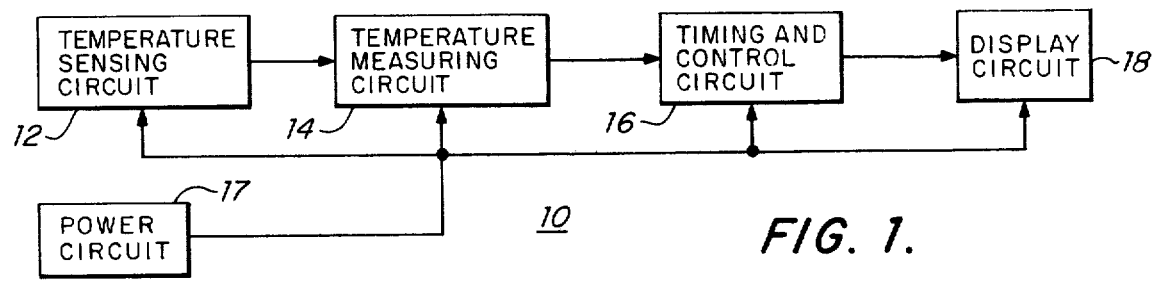
FIG. 1.
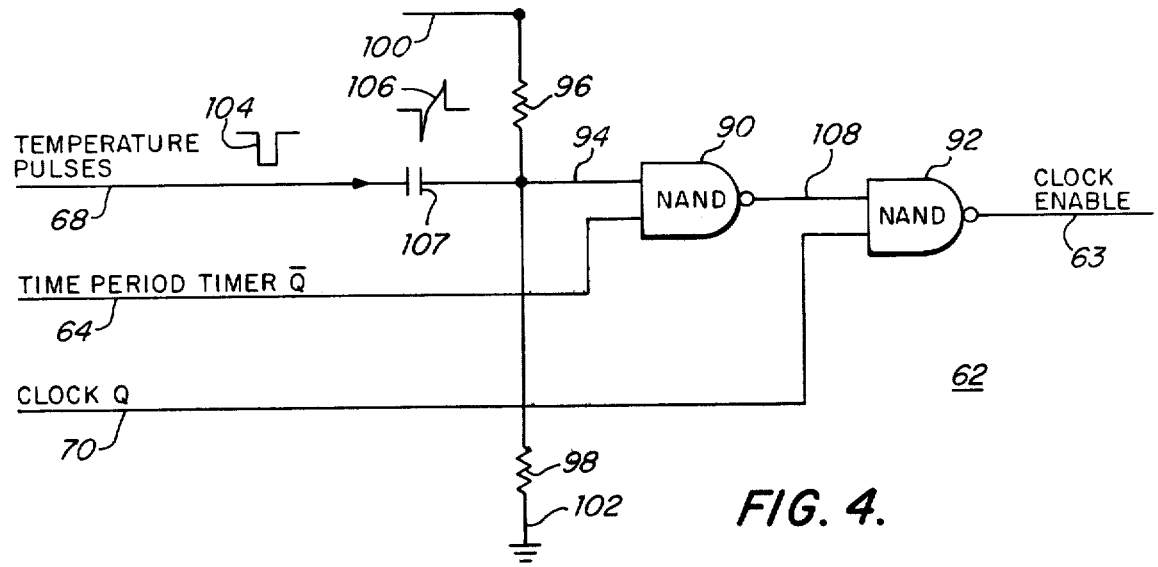
FIG. 4.
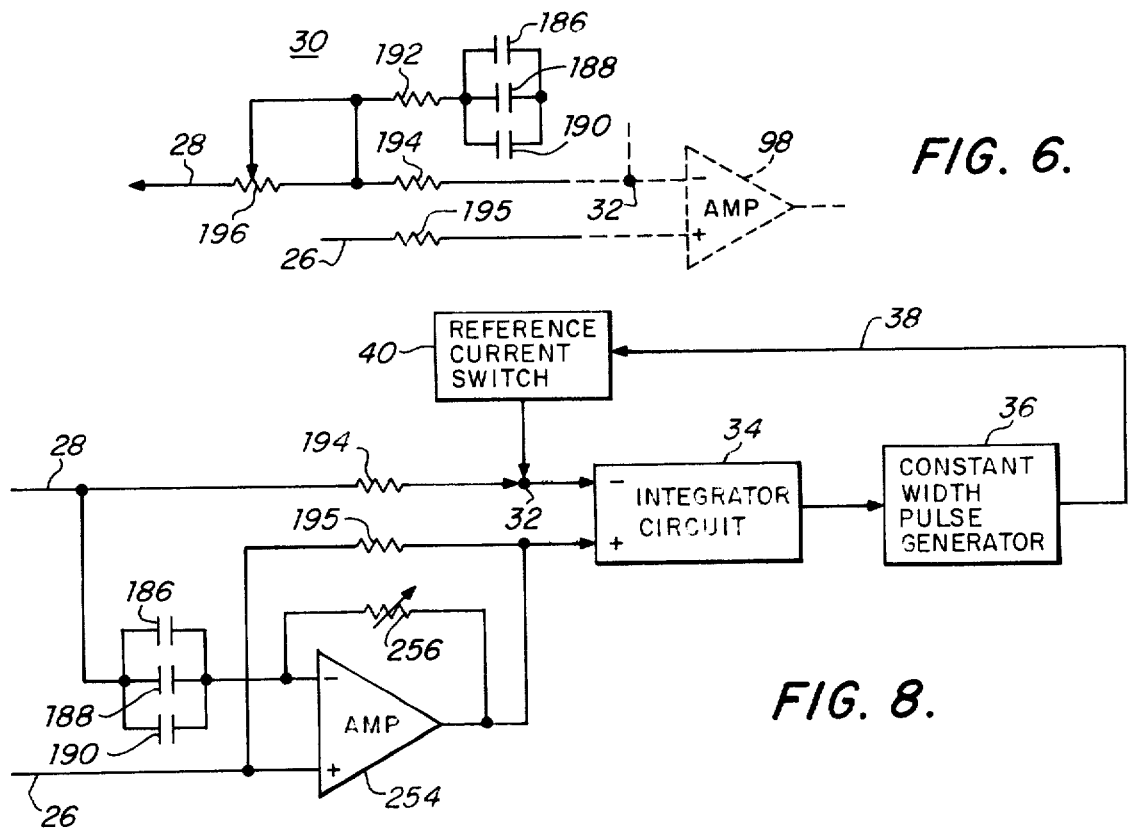
FIG. 6.
FIG. 8.

ELECTRONIC TIME AND TEMPERATURE MEASURING SYSTEM

FIELD OF INVENTION

This invention relates to an electronic thermometer system having a temperature mode and a time mode of operation and more particularly to a timing and control circuit for defining the periods of operation of each mode and the transition between them and to such a system having an anticipation circuit for introducing the final value of the temperature before it has been sensed.

BACKGROUND OF INVENTION

Electronic thermometer systems are being used in the medical field at an increasing rate. These thermometers have relatively fast response time in the order of seconds as compared with a minute or more for mercury thermometers. Electronic thermometer systems are initially more expensive than mercury thermometers but over their life, especially when used with disposable probe covers their cost is comparable with the cost of mercury thermometers considering breakage and cost of routine sterilization. Although the time required for temperature stabilization with electronic thermometer systems is short, sufficient time is required and is usually measured by the use of a wristwatch or similar means whose accuracy is not assured. Preoccupation with the timing requirement prevents the user from using that time for other constructive purposes such as measuring patient heartbeat rates or the like.

SUMMARY OF INVENTION

It is therefore an object of this invention to provide an electronic thermometer system which measures and displays a fixed length of time and a temperature.

It is a further object of this invention to provide such an electronic thermometer system which optimizes use of the same electronic components for both time and temperature measurement and display resulting in a system which is as small, light in weight, compact and inexpensive as ones measuring only temperature.

It is a further object of this invention to provide such an electronic thermometer system which indicates final temperature before it is actually sensed.

This invention features an electronic thermometer system comprising a temperature sensing circuit for providing an analog signal representative of the variations of temperature and a temperature measuring circuit for providing a digital signal representative of the temperature sensed. A timing and control circuit defines an operation interval including a temperature mode period and a time mode period. The timing and control circuit generates pulses to measure a predetermined length of time in the time mode period and it selectively presents at its output the pulses measuring the predetermined length of time in the time mode period and the digital signal representative of the temperature sensed in the temperature mode period. The display circuit responsive to the output selectively displays the measured temperature and time.

In specific embodiments the timing and control circuit may include a clock, a timing network for defining the interval including a first timer for defining the time mode period and a second timer for defining the temperature mode period. There is a gating circuit responsive to the first timer for passing time measurement pulses during the time mode period and temperature measuring signals during the temperature mode period. A temperature count limiting circuit limits the length of time in which the temperature measuring pulses are accumulated during the temperature mode period.

DISCLOSURE OF PREFERRED EMBODIMENT

Other objects, features and advantages will occur from the following description of a preferred embodiment and the accompanying drawings, in which:

FIG. 1 is a block diagram of an electronic thermometer system using a timing and control circuit according to this invention;

FIG. 4 is a detailed, schematic diagram of the gating circuit of FIG. 3;

FIG. 6 is a schematic diagram of the anticipation circuit of FIG. 2;

FIG. 8 is a schematic diagram of an alternative construction of the anticipation circuit of FIG. 2.

Figure 5:
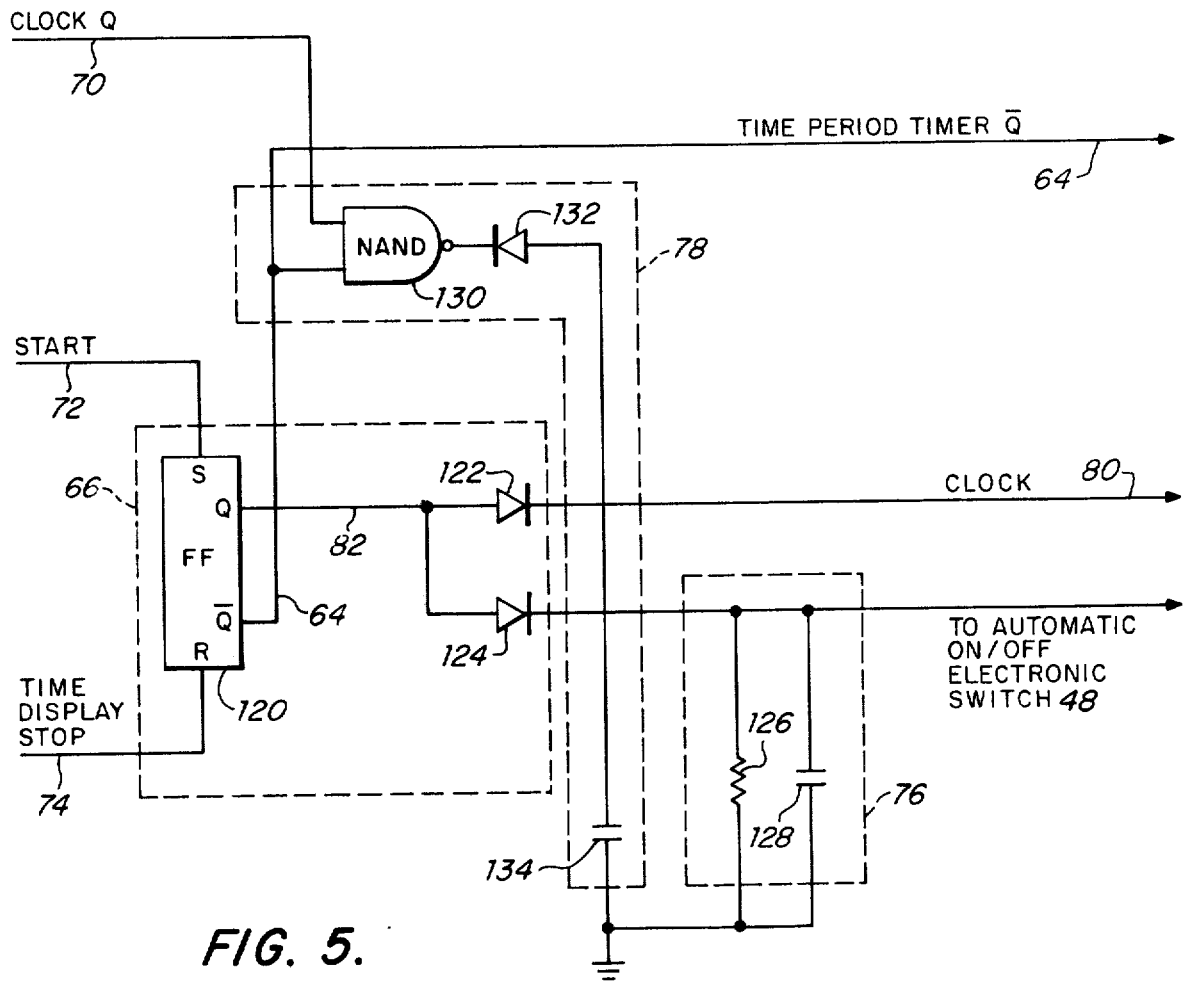
FIG. 5 is a detailed schematic diagram of the time mode timer, temperature mode timer and temperature count limit circuit of FIG. 3.

There is shown in FIG. 1 an electronic thermometer system 10 according to this invention including a temperature sensing circuit 12 which senses variations in temperature and provides a signal representative thereof to measuring circuit 14 which provides a signal representative of the temperature sensed to timing and control circuit 16. Timing and control circuit 16 establishes an operation interval including a time mode period and a temperature mode period during which the time and temperature, respectively, are displayed by display circuit 18. Timing and control circuit 16 generates pulses for measuring a fixed period of time during the time mode period and selectively provides at its output either those pulses during the time mode period or the signal measuring the sensed temperature during the temperature mode period. Power is provided to each of circuits 12, 14, 16 and 18 by power circuit 17.

Figure 2:
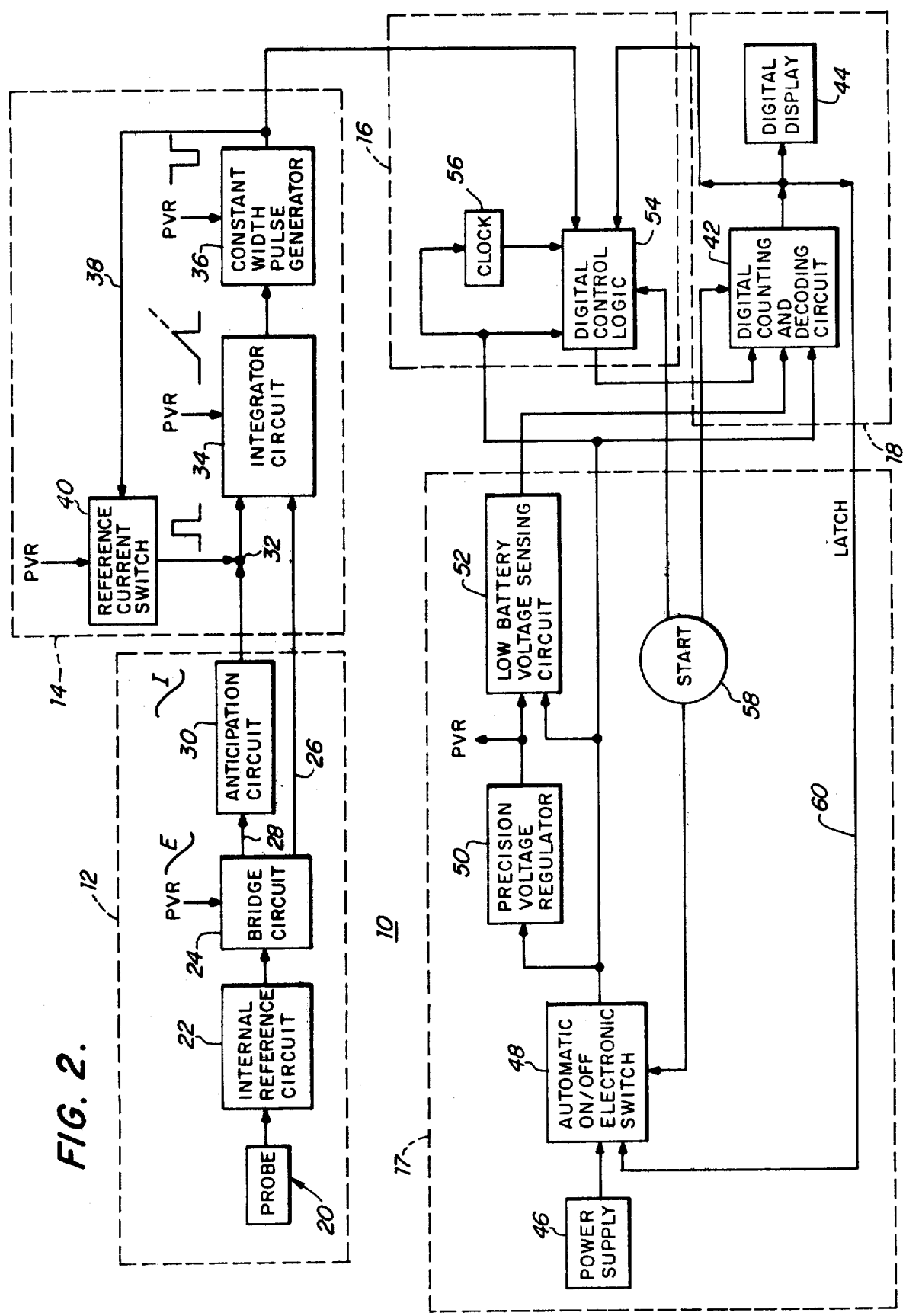
FIG. 2 is a more detailed block diagram illustrating one implementation of the system of FIG. 1.

In one specific embodiment temperature sensing circuit 12 may include a probe 20, FIG. 2 for sensing a temperature to be measured and producing an analog signal representative thereof which is submitted through internal reference circuit 22 to bridge circuit 24. Internal reference circuit 22 selectively connects a matching circuit to bridge circuit 24 in place of the input from probe 20 so that the accuracy and operation of the system can be verified. Bridge circuit 24 provides a reference output on line 26 and on line 28 provides a varying output as a function of the bridge imbalance representing the analog signal which is a function of the temperature sensed by probe 20. In this system used primarily to take the temperatures of humans the measurement range is from 90° to 110°F. Thus reference output 26 of bridge circuit 24 represents the level of 90°F; when output 28 of bridge circuit 24 is equal to reference output 26 thermometer probe 20 is measuring a temperature of 90°F. When output 28 is at a predetermined deviation from the level of output 26 probe 20 is measuring 110°F. Output 28 is fed to anticipation circuit 30 which senses the rate of change of the temperature being sensed by probe 20 and adds to the signal on output 28 from bridge circuit 24, thereby providing a signal at summing point 32 in voltage to rate converter 14 representative of the final value of the temperature being sensed in advance of the actual sensing of that final value.

In measuring circuit 14 the signal at summing point 32 is directed to the negative input of integrator circuit 34 whose positive input receives reference output 26 from bridge circuit 24. A difference between summing point 32 and reference output 26 at the input to integrator 34 causes it to provide a positive slope ramp at its output to constant width pulse genertor 36; which provides a negative going pulse of fixed width when the ramp reaches a predetermined voltage level. The fixed width pulse is delivered along feedback line 38 to reference current switch 40 which produces a positive going pulse having fixed width and fixed amplitude and delivers it to summing point 32. The presence of this pulse restores summing point 32 to the level of output 26 causing the integrator circuit output to drop resulting in a sawtooth output signal. Constant width pulse generator 36 then produces no further pulses to reference circuit switch 40. Therefore no pulses are delivered to summing point 32 and the level at summing point 32 once again moves away from that at the reference output 26. This causes integrator circuit 34 to provide another positive ramp and the cycle to begin again. Since the pulses fed back to summing point 32 have fixed width and fixed amplitude it is the rate of those pulses which must adjust to the relative imbalance between summing point 32 and reference output 26. Thus the greater the difference between these two inputs to integrator circuit 34 the higher will be the repetition rate of the pulses provided at the output of constant width pulse generator 36 and this repetition rate is proportional to the temperature being sensed by probe 20. The illustrated configuration of measuring circuit 14 in FIG. 2 which includes summing point 32, integrator circuit 34, constant width pulse generator 36, feedback line 38 and reference current switch 40 is but one example of a voltage to rate converter which may be used. For example a voltage controlled oscillator or other means for producing an output whose frequency varies in proportion to an analog input signal may be used.

Control and display circuit 18 includes digital counting and decoding circuit 42 which counts the digital pulses provided at the output of constant width pulse generator 36 and decodes that count to display the measured temperature on digital display 44.

All power to the system from power supply 46 is controlled by automatic on-off switch 48 which is turned on by actuation of start switch 58 and remains on independently of further operation of switch 58 until the operation interval including the time mode and temperature mode periods has ended and then automatically turns off. Precision voltage regulator 50 provides regulated voltage, PVR, to bridge circuit 24, reference current switch 40, integrator circuit 34, constant width pulse generator 36 and low battery voltage sensing circuit 52. The other input to low battery voltage sensing circuit 52 is the unregulated power supplied at the output of automatic on-off electronic switch 48. When the unregulated power supply voltage decreases to a predetermined level relative to the regulated voltage output provided by precision voltage regulator 50, low battery voltage sensing circuit 52 provides a signal to digital counting and decoding circuit 42 causing it to extinguish the least significant digit of the temperature appearing in digital display 44.

Electronic thermometer system 10 operates in two modes: a time mode and a temperature mode. Digital control logic 54 supervises system performance in each of these modes and controls the transition between them. In the time mode digital control logic 54 passes time measuring pulses from clock 56 to digital counting and decoding circuit 42; in the temperature mode digital control logic 54 directs temperature measuring pulses from constant width pulse generator 36 to digital counting and decoding circuit 42. The system is operated by actuation of start switch 58.

In operation when start switch 58 is actuated automatic on-off electronic switch 48 is turned on to supply power from power supply 46 to the rest of the system and digital control logic 54 and digital counting and decoding circuit 42 are reset. Probe 20 in contact with the patient whose temperature is to be measured begins to sense the temperature. The voltage E at output 28 of bridge circuit 24 decreases, increasing the negative current I at summing point 32. The difference in levels of output 26 and summing point 32 causes pulses to be generated at the output of constant width pulse generator 36 at a repetition rate required to restore summing point 32 to the proper level. The repetition rate of the pulses at the output of constant width pulse generator 36 stabilizes in a short period of time to represent the final value of the temperature being sensed. This time may be reduced still further by the use of anticipation circuit 30 as explained previously.

Simultaneously with this action, upon the actuation of start switch 58, automatic on-off electronic switch 48 latches itself to stay on for a predetermined period of time after the start switch 58 has been operated. In this particular embodiment, the time mode period precedes the temperature mode period and their durations are typically 20 seconds and 10 seconds, respectively. A signal to automatic on-off electronic switch 48 on line 60 signifies the end of the temperature mode period and of the operation interval. Simultaneously with the actuation of start switch 58 digital control logic 54 passes clock pulses from clock 56 to digital counting and decoding circuit 42. These clock pulses may have a duration of 100 milliseconds so that a count of ten such clock pulses by digital counting and decoding circuit 42 indicates one second. At the end of each second so accumulated digital display 44 is enabled to display the numbers 1 through 19 representing the time. At the end of the twentieth second ditigal control logic 54 transfers the system into the temperature mode by permitting passage, for the period of one clock pulse, of the pulses at the output of constant width pulse generator 36 to digital counting and decoding circuit 42 which accumulates and decodes the count and causes the temperature to be displayed.

Figure 3:
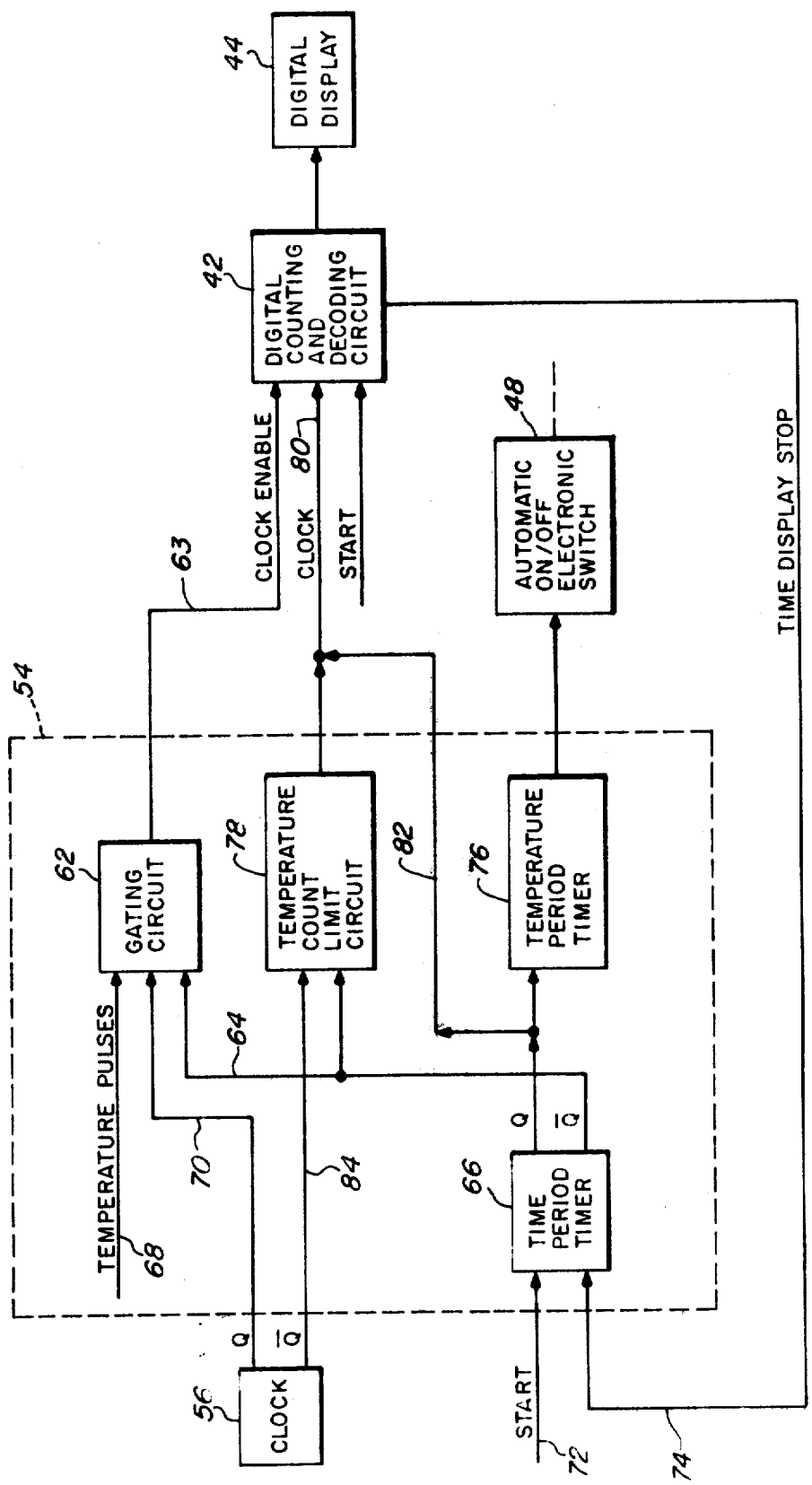
FIG. 3 is a more detailed block diagram of the digital control logic of FIG. 2.

In one specific embodiment digital control logic 54 includes a gating circuit 62, FIG. 3, which is enabled by the Q output on line 64 from time period timer 66 to pass on line 63 either the temperature pulses on line 68 or the clock pulses Q on line 70 to the clock enable input of digital counting and decoding circuit 42. Time period timer 66 defines the time mode period beginning with the arrival of a start signal on line 72 from start switch 58 and ending with a time display stop signal on line 74 from digital counting and decoding circuit 42 which occurs when digital counting and decoding circuit 42 has measured the fixed length of time constituting the time mode period: in this specific embodiment 20 seconds. During the time mode period the Q output of time period timer 66 is high and the Q̄ output is low. After that, during the temperature period, the Q output of time period timer 66 is low and the Q̄ is high.

Digital control logic 54 also includes a temperature period timer 76 which continues to enable the automatic on-off electronic switch 48 to remain on for the remainder of the operation interval during the temperature period, after the time period has ended, as significantly by the switching of the Q output of time period timer 66 from the high to the low state.

Temperature count limit circuit 78 is enabled by the Q̄ output of time period timer 66 at the end of the time mode period to disable the clock input to digital counting and decoding circuit 42 at the end of the first clock pulse following the beginning of the temperature period. This limits the counting of temperature pulses on line 68 to the number occurring during that clock pulse.

In operation a start signal on line 72 causes time period timer 66 to provide a high Q output through temperature period timer 76 to automatic on-off electronic switch 48 to energize the system and simultaneously to provide a high Q output over line 82 to clock input 80 of digital counting and decoding circuits 42. Simultaneously the Q̄ output of time period timer 66 inhibits operation of temperature count limit circuit 78 and provides an enabling input on line 64 to permit gating circuit 62 to pass clock pulses on line 70 over clock enable line 63 to digital counting and decoding circuits 42 which counts those clock pulses to measure a fixed period of time. When the fixed period of time has been measured at the end of the time period a time display stop signal is fed back on line 74 to switch time period timer 66 so that its Q output goes low and its Q̄ goes high. In response temperature period timer 76 acts to sustain automatic on-off electronic switch 48 in the on condition. The high Q̄ output of time period timer 66 causes temperature count limit circuit 78 to continue to enable clock input on ine 80 to digital counting and decoding circuit 42. The high Q̄ input on line 64 of gating circuit 62 now causes gating circuit 62 to stop passing clock pulses Q on input 70 and begin passing the temperature pulses appearing on line 68 over the clock enable line 63 to digital counting and decoding circuit 42. Temperature pulses on line 68 however, will only be passed on the clock enable line to be counted by digital counting and decoding circuit 42 during the extent of the next single clock pulse Q which appears on line 70. For following that, with the appearance of the clock pulse Q on line 84 temperature count limit circuit 78 is enabled to provide a signal on line 80 to disable the clock input and cease the counting of the temperature pulses.

Gating circuit 62 includes two NAND gates 90, 92, FIG. 4. One input to NAND gate 90 is the Q̄ output on line 64 from time period timer 66; the other input on line 94 is connected to a voltage divider including resistors 96 and 98 connected between unregulated power supplied on line 100 and ground 102. Negative going temperature pulses 104 from constant width pulse generator 36 are coupled to line 94 of NAND gate 90 through AC coupling capacitor 107 which transforms pulse 104 to the form of pulse 106 i.e. a sharp negative going pulse followed by a sharp positive going pulse. The voltage divider provided by resistors 96 and 98 maintains a quiescent voltage on line 94 which is sufficiently positive to be considered a high input to NAND gate 90. Thus only during the extreme of the negative going portion of pulse 106 does input 94 of NAND gate 90 go low. Nevertheless the solid low signal provided by the Q output of time period timer 66 on line 64 keeps the output of NAND gate 90 high for the entire time mode period so that NAND gate 92 which receives this signal on line 108 is enabled to pass each clock pulse Q which occurs on line 70 during the time mode period and delivers them on clock enable line 63 to digital line 63 to digital counting and decoding circuit 42 to be counted. At the end of the time mode period when the Q output of time period timer 66 goes high to input on line 64 to NAND gate 90 will go high. Thus with the solid high quiescent point on line 94 NAND gate 90 will provide a low output except for the periodic occurrence of the negative going portion of the pulse 106 which will provide short positive going pulses on line 108 to NAND gate 92. The next clock pulse Q occurring on line 70 causes that line to go high. Thus all of the temperature pulses, which are presented on line 108 during the period of the clock pulse Q on line 70 i.e. from 1 to 2,000, will be passed over clock enable line 63 to be counted by digital counting and decoding circuit 42. Subsequent to that clock pulse, temperature count limit circuit 78 prevents digital counting and decoding circuit 42 from further counting temperature pulses.

Time period timer 66 includes a flip-flop 120, FIG. 5, and diodes 122 and 124. Temperature period timer 76 includes an RC circuit including resistor 126 and capacitor 128. Temperature count limit circuit 78 includes NAND gate 130, diode 132 and capacitor 134.

A start signal on line 72 sets flip-flop 120 causing it to provide its high Q output on line 82 and low Q̄ output on line 64. The high Q output on line 82 is fed through diode 122 on line 80 to the clock input of digital counting and decoding circuit 42 and through diode 124 to charge capacitor 128 in temperature period timer 76. Simultaneously, the high Q output on line 82 through diode 124 is charging capacitor 134. The low Q̄ output on line 64 which will remain through the entire time mode period keeps the output of NAND gate 130 high and back biases diode 132 so that capacitor 134 can not discharge. At the end of the time mode period the time display stop signal on line 74 resets flip-flop 120 causing its Q output on line 82 to go low and its Q̄ output on line 64 to go high. There is no longer current flowing on line 82 through diodes 122 and 124. However, these diodes are back biased to prevent discharge of capacitor 134 and capacitor 128 through the low Q output. During this, the first clock period, clock 56 is providing the first clock pulse Q of the temperature mode period; conversely the clock pulse Q̄ input on line 70 of NAND gate 130 is low thereby maintaining the output of NAND gate 130 high even through the other input to NAND gate 130 on line 64 is high. The continued high output of NAND gate 130 keeps diode 132 back biased so that capacitor 134 can not discharge. However, capacitor 128 does begin discharging through resistor 126 immediately upon the switching of flip-flop 120 by the time display stop signal on line 74. The RC time constant of resistor 126 and capacitor 128 defines the temperature mode period and maintains the enabling signal to automatic on-off electronic switch 48 for the temperature mode period of the operation interval. Immediately after the end of the first clock pulse Q during which temperature pulses are being counted, clock pulse Q on line 70 goes high causing the output of NAND gate 130 to go low and provide a discharge path for capacitor 134 through diode 132. This removes the signal on line 80 from the clock input to digital counting and decoding circuit 42 and prevents digital counting and decoding circuit 42 from further counting temperature pulses.

Anticipation circuit 30 includes one or more capacitors 186, FIG. 6, 188 and 190 which provide an RC constant which closely matches the thermal time constant of probe 20. Resistor 192 may also be used to adjust the RC time constant.

Adjustable resistor 196, shown for convenience as a part of anticipation circuit 30, is used in conjunction with resistor 194 to limit the current flowing from bridge circuit 24 to summing point 32 and thereby control the pulse repetition rate of the output of constant width pulse generator 36 for a given bridge imbalance. For example, resistor 196 is typically adjusted so that a temperature of 90°F produces a zero pulse rate, a temperature of 100°F causes a pulse rate of 1,000 pulses per second and a temperature of 110°F produces a pulse repetition rate of 2,000 pulses per second. Resistor 195 is provided at reference output 26.

Figure 7:
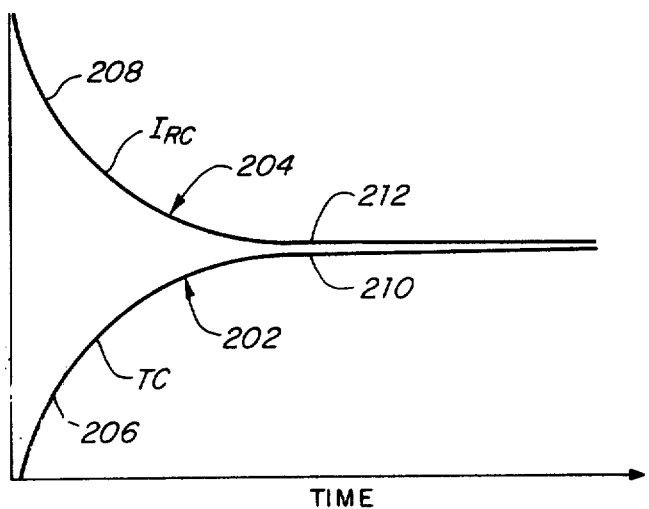
FIG. 7 is a graph illustrating the RC constant of the anticipation circuit and the thermal constant exhibited by the probe of FIGS. 2 and 6.

The manner in which anticipation circuit 30 operates to provide an advance indication of the final value of the temperature being measured before that final value is actually measured may be better understood with reference to FIG. 7 which illustrates thermal time constant 202 of probe 20 and the current characteristic 204 through the RC network of anticipation circuit 30; curves 202 and 204 closely resemble a mirror image of each other: each has an initial steep portion 206, 208 and a terminal flat portion 210, 212. At the beginning of the temperature measuring cycle when the thermal time constant 202 indicates that the temperature of the probe 20 is increasing at a very high rate the current at output 28 of bridge circuit 24 (the current passed by capacitors 186, 188 and 190) is also high. The capacitors thus conduct heavily introducing additional current to summing point 32 causing summing point 32 to experience a current flow representative of a temperature value which has not yet been sensed. As the rate of temperature increase slows so too does the rate of current increase and thus the current through the capacitors to that the final condition is correctly portrayed by summing point 32 well in advance of the time when the final value of temperature is actually sensed by probe 20.

Anticipation circuit 30 may advantageously be configured differently. For example, since positive pulses from reference current switch 40 are fed directly to summing point 32 in which anticipation circuit capacitors 186, 188 and 190 are connected, these capacitors tend to decrease the magnitude and shape of these positive pulses thereby lowering the loop gain through integrator circuit 34, constant width pulse generator 36 and reference current switch 40. This problem may be overcome by using the approach shown in FIG. 8 where the anticipation circuit is no longer connected to summing point 32 at the negative input to integrator circuit 34 but rather is supplied to the reference output 26 at the positive input of integrator circuit 34. Capacitors 186, 188 and 190 are connected to the negative input terminal of amplifier 154. The other ends of these capacitors are connected to variable output 28 as before which also, as before, is connected through resistor 194 to summing point 32, and the negative input of integrator circuit 34.

The positive input of amplifier 254 is connected to reference output 26 which is also connected as before through resistor 195 to the positive input of integrator circuit 34; an adjustable feedback resistor 256 is connected between the input and output of amplifier 154. Thus the configuration shown in FIG. 8 removes the connection of the anticipation circuit to the summing point 32, so that the pulses from reference current switch 40 are no longer effected by capacitors 186, 188 and 190. The configuration of FIG. 8 also illustrates that the anticipation function can be accomplished by adjusting the reference output 26 instead of varying output 28.

Other embodiments will occur to those skilled in the art and are within the following claims:

What is claimed is:

1. An electronic thermometer system having an operation interval including a temperature mode period during which a measured temperature is displayed and a time mode period during which a measured length of time is displayed, comprising: a temperature sensing circuit for providing an analog signal representative of variations in temperature; a temperature measuring circuit, responsive to said analog signal representative of variations in temperature provided by said temperature sensing circuit, for providing a digital signal representative of the temperature sensed; a timing and control circuit, responsive to said digital signal representative of the temperature sensed provided by said temperature measuring circuit, and defining an operation interval including a temperature mode period and a time mode period, for generating a signal representative of a predetermined length of time during said time mode period and for selectively presenting its output, said signal representative of said predetermined length of time during said time mode period and said digital signal representative of the temperature sensed during said temperature mode period; and a display circuit responsive to said output from said timing and control circuit for selectively displaying, during said temperature mode period, the measured temperature indicated by said digital signal representative of the temperature sensed and displaying, during said time mode period, the measured time indicated by said signal representative of said predetermined length of time.

2. The system of claim 1 in which said timing and control circuit includes a clock circuit, a timing network for defining said interval including a first timer for defining said time mode period and a second timer for defining said temperature mode period; a gating circuit responsive to said clock circuit and said first timer for passing said signal representative of said predetermined length of time during said time mode period and said digital signal representative of the temperature sensed during said temperature mode period; and a temperature count limit circuit, responsive to said first timer and said clock circuit, for limiting the length of time in which said digital signal representative of the temperature sensed is accumulated during said temperature mode period.

3. The electronic thermometer system of claim 1 in which said temperature sensing circuit includes an anticipation circuit responsive to the rate of change of said analog signal representative of the temperature being sensed to increase the current flow to said temperature measuring circuit for driving the system to indicate the final value temperature before that temperature is actually measured.

4. an electronic thermometer system having a temperature mode of operation during which a measured temperature is displayed and a time mode of operation during which a measured length of time is displayed, comprising: a timing and control circuit responsive to a signal representative of said measured temperature and defining an operation interval including a temperature mode period and a time mode period, for generating a signal representative of a predetermined length of time during said time mode period and for selectively presenting at its output a signal representative of said measured temperature during said temperature mode period and said signal representative of a predetermined length of time during said time mode period for display of said measured temperature and said measured length of time.

5. An electronic thermometer system having a temperature mode of operation during which a measured temperature is displayed and a time mode of operation during which a measured length of time is displayed, comprising: a timing and control circuit, for generating a signal representative of said measured length of time and responsive to a signal representative of said measured temperature including, a clock circuit, a timing network including a first timer for defining said time mode period and a second timer for defining said temperature mode period; a gating circuit responsive to said clock circuit and said first timer for passing said signal representative of said measured length of time during said time mode period and said signal representative of said measured temperature during said temperature mode period; and a temperature count limit circuit, responsive to said clock circuit and said first timer, for limiting the length of time in which said signal representative of said measured temperature is received during said temperature mode period.

6. An electronic thermometer system having an operation interval including a temperature mode period during which a measured temperature is displayed and a time mode period during which a measured length of time is displayed, comprising: a temperature sensing circuit for providing an analog signal representative of variations in temperature; a temperature measuring circuit, responsive to said analog signal representative of variations in temperature provided by said temperature sensing circuit, for providing a digital signal representative of the temperature sensed, a timing and control circuit, responsive to said digital signal representative of the temperature sensed provided by said temperature measuring circuit, and defining an operation interval including a temperature mode period and a time mode period, for generating a signal representative of a predetermined length of time during said time mode period and for selectively presenting at its output said signal representative of said predetermined length of time during said time mode period and said digital signal representative of the temperature sensed in said temperature mode period; and a display circuit responsive to said output from said timing and control circuit for selectively displaying, during said temperature mode period, the measured temperature indicated by said digital signal representative of the temperature sensed and displaying, during said time mode period, the measured time indicated by said signal representative of said predetermined length of time; said temperature sensing circuit including an anticipation circuit responsive to the rate of change of said analog signal representative of the temperature being sensed to increase the current flow to said temperature measuring circuit for driving the system to indicate the final value of the temperature before that value is actually measured.

* * * * *